J. T. EZZELL.
PLOW ATTACHMENT.
APPLICATION FILED OCT. 25, 1909.
964,411.
Patented July 12, 1910.
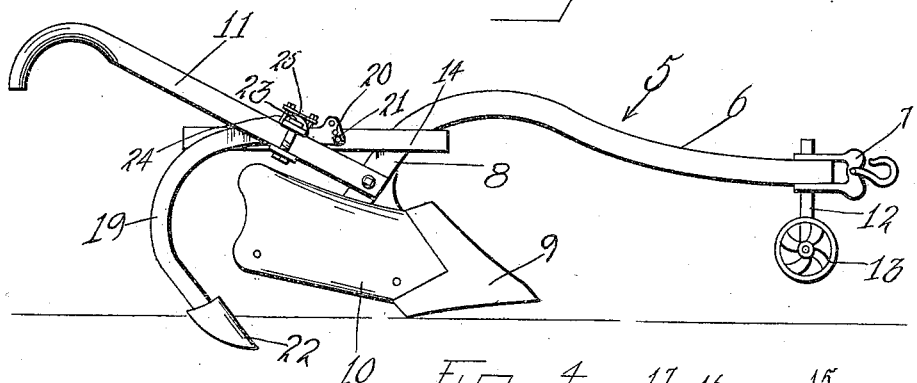
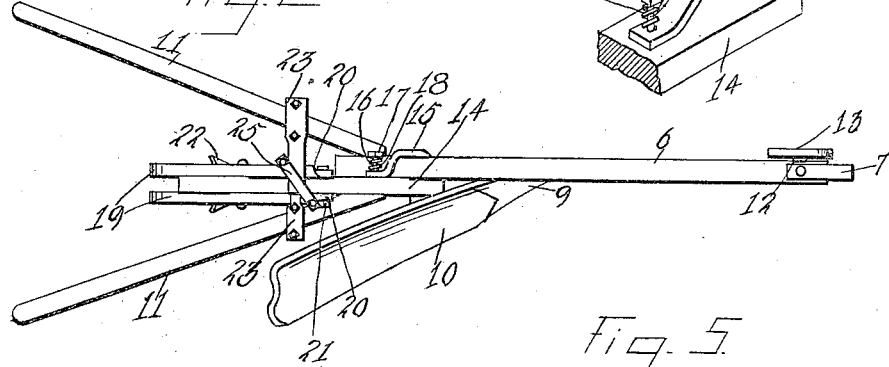
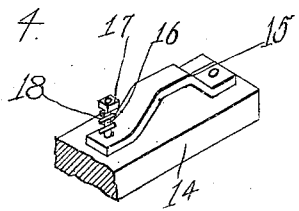
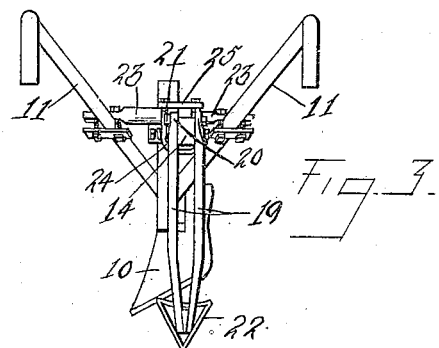
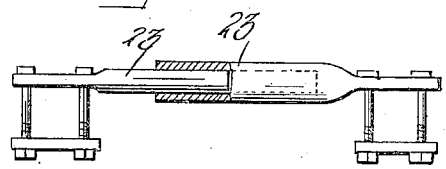
Witnesses
Inventor
JOHN T. EZZELL
By
Attorneys

UNITED STATES PATENT OFFICE.

JOHN T. EZZELL, OF PIEDMONT, ALABAMA.

PLOW ATTACHMENT.

964,411.  Specification of Letters Patent.  Patented July 12, 1910.

Application filed October 25, 1909.  Serial No. 524,542.

*To all whom it may concern:*

Be it known that I, JOHN T. EZZELL, a citizen of the United States, residing at Piedmont, in the county of Calhoun, State of Alabama, have invented certain new and useful Improvements in Plow Attachments; and I do hereby declare the following to be a full, clear, and exact description of the invention, such as will enable others skilled in the art to which it appertains to make and use the same.

The invention relates to a plow attachment and more particularly to the class of subsoiling attachments for plows of the ordinary well known type.

The primary object of the invention is the provision of a plow attachment in which the same may be readily and quickly mounted or secured to a plow of the ordinary type to enable the land to be cultivated for turning and subsoiling it subsequent to the forming of an open furrow in the ground by the plow.

Another object of the invention is the provision of an attachment which is adapted to be securely mounted upon various styles of plows without altering the construction thereof and that will enable the subsoil to be kept in the center of a furrow made by the turning blade of the plow for cultivation of the soil.

A further object of the invention is the provision of a plow attachment which is simple in character, thoroughly reliable and effective in operation, readily and easily attached and detached from various styles of plows, and one that is inexpensive in manufacture.

With these and other objects in view, the invention consists in the construction, combination and arrangement of parts, as will be hereinafter more fully described, illustrated in the accompanying drawings, which disclose the preferred form of embodiment of the invention and its manner of application, and as pointed out in the claims hereunto appended.

In the drawings:—Figure 1 is a side elevation of a plow with the invention applied thereto. Fig. 2 is a top plan view thereof. Fig. 3 is a rear elevation. Fig. 4 is a fragmentary detail view of the clip for connecting the attachment to the plow beam. Fig. 5 is a sectional elevation of the telescoping braces forming part of the invention.

Similar reference characters indicate corresponding parts throughout the several views in the drawings.

Referring to the drawings by numerals 5 designates generally a plow of the ordinary well known construction comprising a steel plow beam 6 having connected at its forward end a draft clevis 7, and this beam 6, has a downwardly curved leg terminal 8, to which latter is suitably connected a cutter point 9, and also a curved side mold board 10, and directly above the mold board and connected to the beam 6 are outwardly diverging handles 11, for the guiding of the plow. Near the forward end of the beam and carried thereby is a standard 12, supporting a rotatable ground wheel 13, which latter is adapted to support the forward end of the plow beam when the plow is in operation for cutting and turning the soil for forming an open furrow.

The plow attachment comprises a short beam 14, the latter having secured near its forward end an outwardly bowed clip 15, which latter is adapted to engage the plow beam 6, above the handles 11 connected thereto, so as to hold the short beam 14, in parallelism with the plow beam. Passed through the short beam 14, and through a suitable opening in the clip 15, is a bolt 16, the same carrying the usual nut 17, between which latter and the clip 15 and surrounding the bolt is a coiled tension spring 18, and by means of this spring 18, the clip will snugly engage the plow beam 6, and also permit slight lateral displacement of the short beam when connected to the latter.

Pivotally connected to the short beam 14, is a curved plow standard 19, the same having enlarged upper terminals or spaced ears 20, containing suitable openings registering with each other and through a pair of these openings is passed a bolt member 21, which latter is also passed through the short beam and in this manner the plow standard 19, may be adjusted for shallow or deep cutting of the soil. To the lower end of the plow standard 19 is mounted a plow blade or share 22, which latter travels in the open furrow in rear of the cutter point 9, of the plow for subsoiling purposes.

Transversely disposed between the handles 11 of the plow are adjustable brace rods 23, one of which telescopes within the other and each of which has its outer end detachably connected to one of the handles 11 of the plow. These adjustable brace rods 23 are also detachably connected to the short beam 14 by a U-shaped clip 24, carrying a bridge plate 25, diagonally disposed across the brace rod and in this manner the short beam is held against lateral displacement and in parallelism with the plow beam 6 of the plow.

From the foregoing the construction and operation of the invention will be clearly apparent, without the necessity of a more extended explanation and therefore the same has been omitted.

What is claimed is:—

1. The combination with a plow beam and its handles connected thereto, of a subsoiling attachment comprising a short beam detachably clipped to the plow beam, a plow standard pivotally supported by the short beam, and brace means detachably connected to the handles and the short beam.

2. The combination with a plow beam and its handles connected thereto, of a subsoiling attachment comprising a short beam detachably clipped to the plow beam, a plow standard pivotally supported by the short beam, and brace means detachably connected to the handles and the short beam, and means adjustably holding the plow standard to the short beam.

In testimony whereof, I affix my signature, in presence of two witnesses.

JOHN T. EZZELL.

Witnesses:
S. B. ESTES,
B. C. FORMLY.